(12) United States Patent
Chen et al.

(10) Patent No.: US 11,733,917 B2
(45) Date of Patent: Aug. 22, 2023

(54) HIGH BANDWIDTH CONTROLLER MEMORY BUFFER (CMB) FOR PEER TO PEER DATA TRANSFER

(71) Applicant: PetaIO Inc., Santa Clara, CA (US)

(72) Inventors: Yimin Chen, San Diego, CA (US); Fan Yang, Fremont, CA (US)

(73) Assignee: PETAIO INC., Santa Clara, CA (US)

( * ) Notice: Subject to any disclaimer, the term of this patent is extended or adjusted under 35 U.S.C. 154(b) by 401 days.

(21) Appl. No.: 17/024,575

(22) Filed: Sep. 17, 2020

(65) Prior Publication Data

US 2022/0083267 A1 Mar. 17, 2022

(51) Int. Cl.
*G06F 3/06* (2006.01)
*G06F 13/42* (2006.01)

(52) U.S. Cl.
CPC ............ *G06F 3/0659* (2013.01); *G06F 3/061* (2013.01); *G06F 3/0679* (2013.01); *G06F 13/4221* (2013.01); *G06F 13/4234* (2013.01); G06F 2213/0026 (2013.01)

(58) Field of Classification Search
CPC ............... G06F 3/0659; G06F 13/4221; G06F 2213/0026; G06F 3/0679; G06F 3/061; G06F 13/4234
See application file for complete search history.

(56) References Cited

U.S. PATENT DOCUMENTS

2014/0215129 A1* 7/2014 Kuzmin .............. G06F 12/0246
711/103
2018/0341606 A1* 11/2018 Bolkhovitin .......... G06F 3/0656

* cited by examiner

*Primary Examiner* — Tammara R Peyton
(74) *Attorney, Agent, or Firm* — David R. Stevens; Stevens Law Group

(57) ABSTRACT

A PCIe architecture is disclosed incorporating a controller memory buffer (CMB). Write data is written to the CMB and is not read out for processing upon receiving a write command for the write data. The data is read out of the CMB and processed to obtain processed data upon receiving feedback from a NAND channel controller. The processed data may be written directly to the NAND channel controller or may be written to a light write buffer that is read by the NAND channel controller. The processed data may be written to a light write buffer functioning as a cut through buffer.

18 Claims, 6 Drawing Sheets

HIGH BANDWIDTH CONTROLLER MEMORY BUFFER (CMB) FOR PEER TO PEER DATA TRANSFER

BACKGROUND

Field of the Invention

This invention relates to systems and methods for implementing a controller memory buffer, such as for a PCIe NVMe SSD.

Background of the Invention

The controller memory buffer (CMB) was added to the NVMe (non-volatile memory Express) standard revision 1.2. The intention for this new feature was to reduce latency in command execution and improve efficiency in a PCIe (Peripheral Component Interconnect Express) fabric topology that may include multiple switches. In particular, it allows the host to push command-related information to a drive, instead of having the drive fetch the information from the system memory over the PCIe fabric.

CMBs are a memory mapped region that resides in the PCIe BAR (base address registers). They can hold either generic data or data associated with an NVMe IO (input/output) command. Besides the originally proposed usage, CMBs are being widely adopted for many other applications such as NVMe-over-fabric (NVMeoF), data copy between SSDs, near storage computation, etc.

All these new applications require data movement between various PCIe endpoints such as SSDs (solid state drives), RNIC (remote direct memory access (RDMA) network interface controller), acceleration card, etc. Traditionally, transfer between two of these PCIe endpoint devices requires the use of a staging buffer in the system memory as well as use of the CPU's processing power.

What is needed is an improved approach for implementing a CMB.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
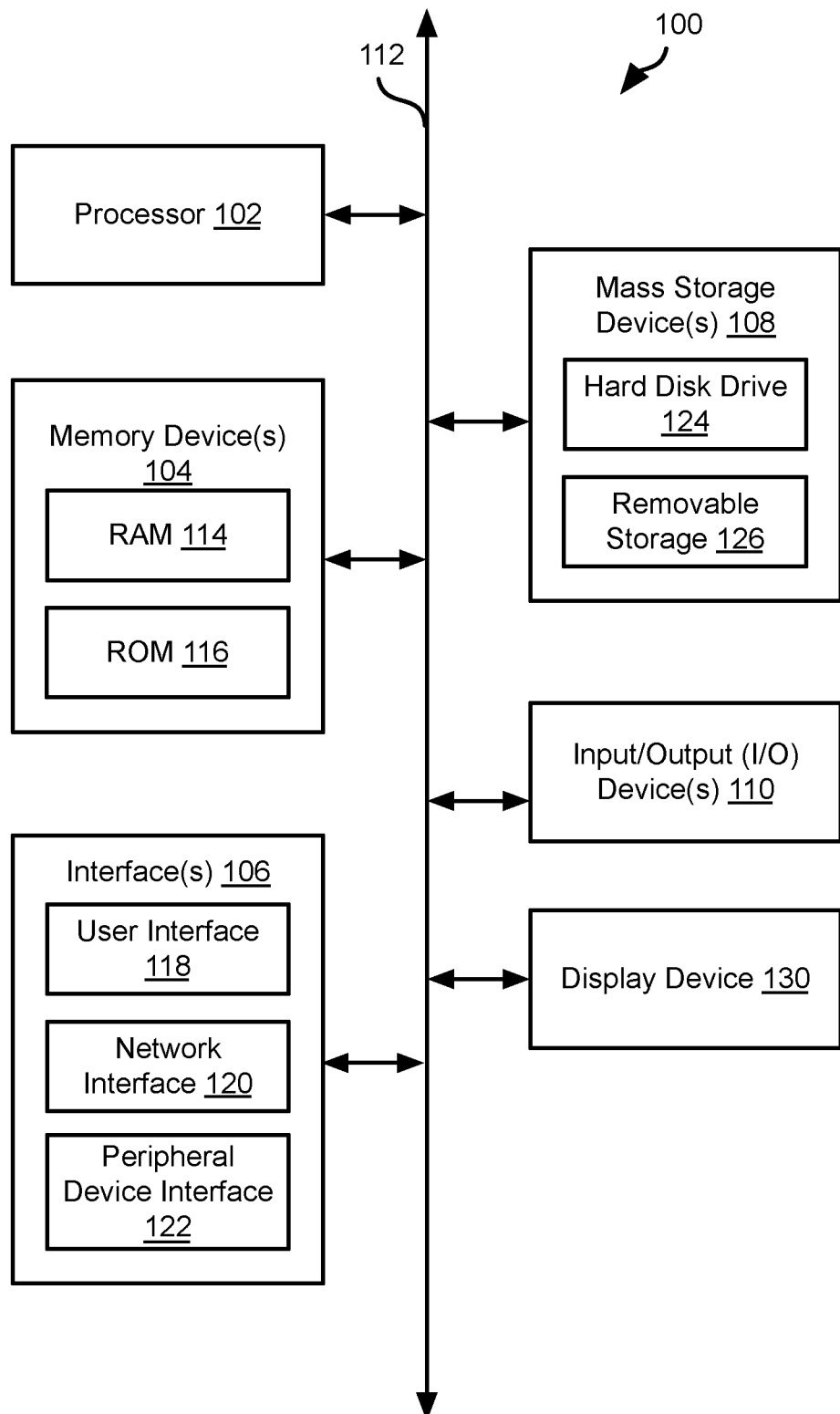
FIG. 1 is a schematic block diagram of a computing system suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). memory device(s) 104 may also include rewritable ROM, such as flash memory.

Mass storage device(s) 108 include various computer readable media, such as magnetic tapes, magnetic disks, optical disks, solid-state memory (e.g., flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2A:
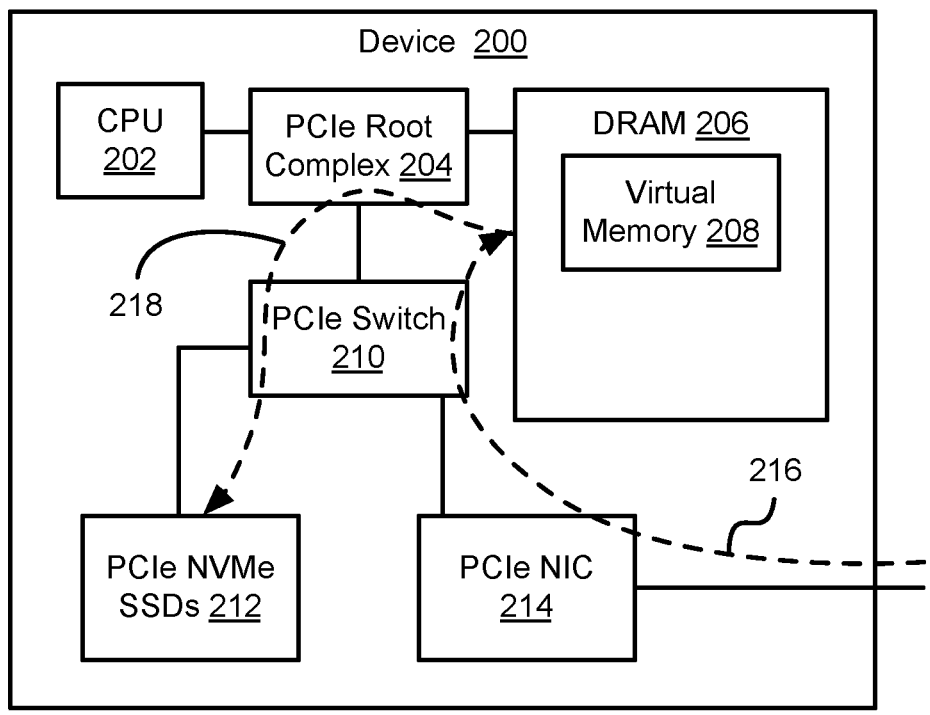
FIG. 2A is a schematic block diagram of a NVMeoF device without a CMB in accordance with the prior art.
Figure 2B:
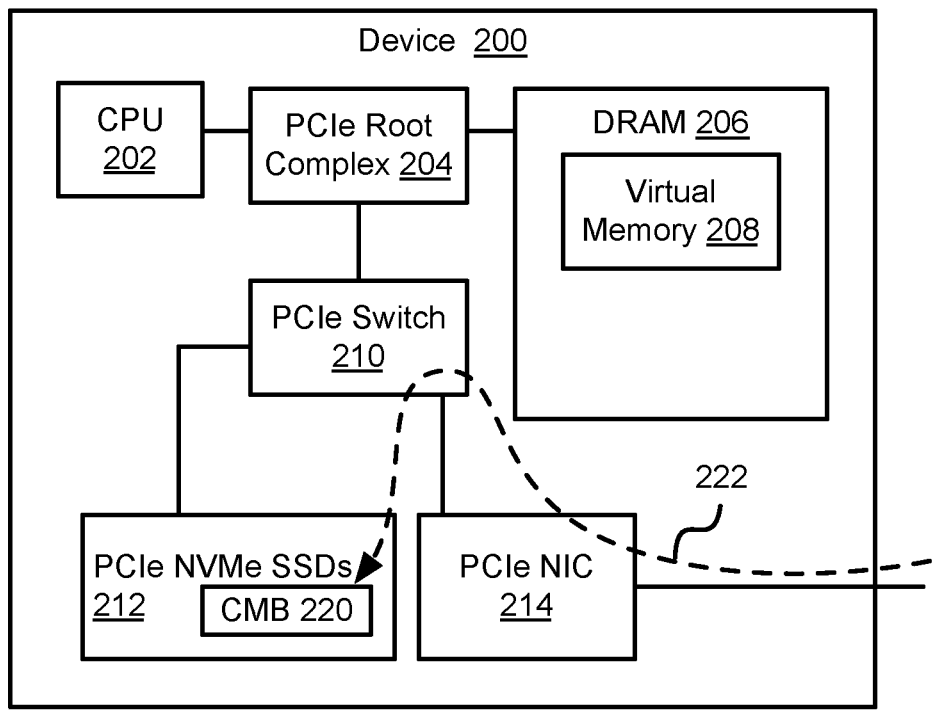
FIG. 2B is a schematic block diagram of a NVMeoF device with a CMB in accordance with the prior art.

FIGS. 2A and 2B illustrate a conventional device 200 implementing NVMe. In particular, FIG. 2A illustrates a NVMeoF storage device without a controller memory buffer (CMB) and FIG. 2B illustrates a NVMeoF storage device with a CMB. Each device may include a CPU (central processing unit) 202 coupled by a PCIe root complex 204 to DRAM (dynamic random access memory) 206. The DRAM 206 may host a virtual memory 208.

The PCIe root complex 204 is coupled to a PCIe switch 210 that is coupled to one or more components in the PCIe fabric topology, such as one or more PCIe NVMEe SSDs 212 ("SSD 212") and/or a PCIe NIC 214.

When the remote host application issues a write command towards a SSD 212 without CMB, the write data 216 is buffered in the system memory 206 first before the device application could issue an NVMe over PCIe command to the SSD 212, which will then fetch 218 the data from the system memory 206 and executes the command by writing the data to a NAND device.

When there is a CMB 220 in the SSD 212, the write data can be pushed 222 directly into the CMB 220. When the SSD 212 receives a write command either from the device application or from a NVMeoF accelerator, the controller of the SSD 212 reads the data out from the CMB 220 and writes it to the NAND device.

The CMB size is currently from tens to hundreds megabytes in a typical implementation. Except for the scenarios where the CMB 220 is implemented with non-volatile memories (PCM, MRAM, ReRAM etc.), it is common to use DRAM as the physical media for the CMB 220. This potentially causes write throughput issues in a typical SSD architecture where the DRAM is also used for a write data buffer.

Figure 3:
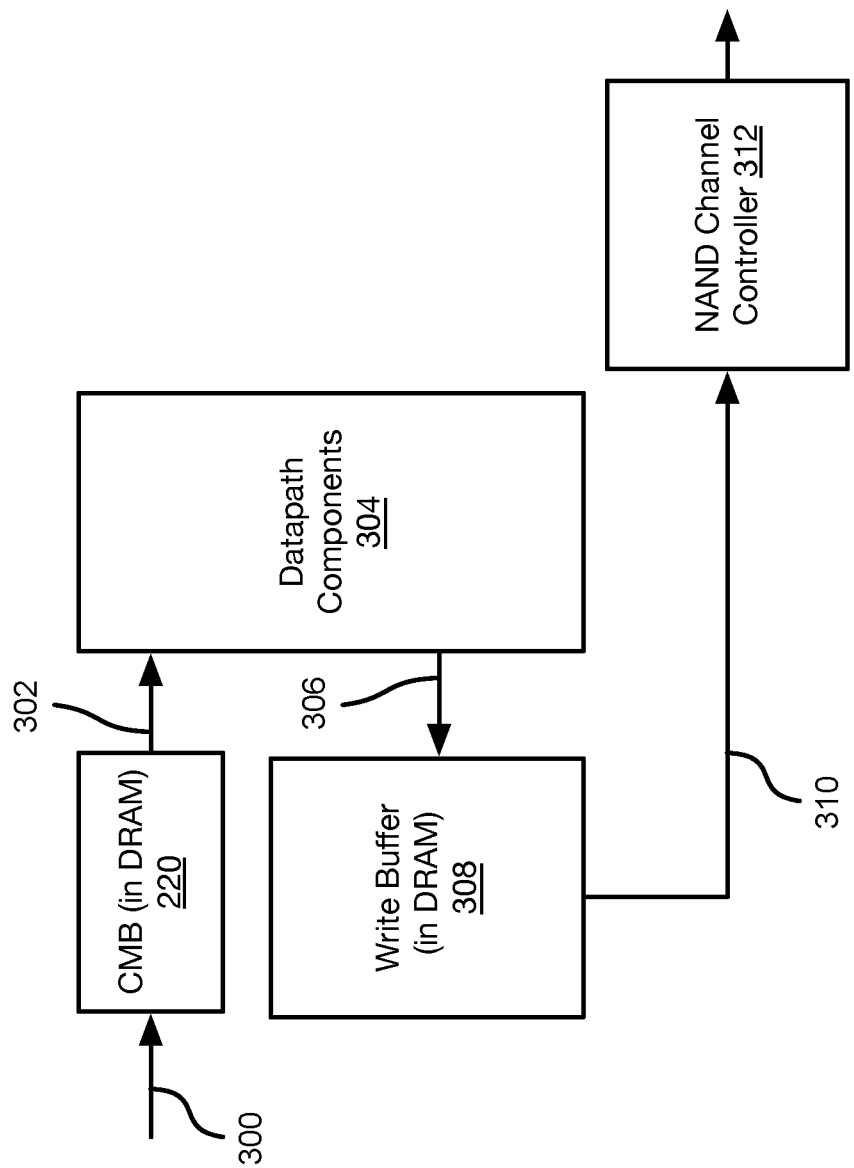
FIG. 3 is a schematic block diagram of components implementing a write data flow involving a CMB in accordance with the prior art.

The prior approach to implementing a Controller Memory Buffer (CMB) into PCIe NVMe SSDs causes a bandwidth bottleneck in various peer-to-peer applications. This bottleneck is illustrated in FIG. 3.

A host writes 300 raw data to the CMB 220, such as in the form of a PCIe MWr command, where the CMB 220 is implemented in a DRAM. At this point, the SSD 212 has no knowledge on how to associate this data with a command. After the host sends an IO command, SSD 212 is aware of the format of the logical block including the raw data. The SSD 212 then transfers 302 the raw data as a logical block to datapath components 304. The datapath components 304 will read the data out, process the logical block, then write 306 the processed data to a write buffer 308 that is also in the DRAM. The datapath components 304 can implement End-to-End (E2E) protection, metadata handling and assembly, encryption, compression, padding, error correction codes (ECC), etc.

When a NAND die mapped to the write 300 is ready for transfer, the processed data will be read out from the write buffer 308 and written 310 into the NAND by a NAND channel controller 312.

As can be seen from the diagram, if the CMB 220 and the write buffer 308 reside in the same physical memory, the write throughput will be bottlenecked by the DRAM bandwidth.

The embodiments disclosed below solve this bottleneck by delaying the write data NAND transfer so that the tenure of the data residing in the write buffer is reduced. By doing so the write buffer can be replaced by a smaller SRAM or a cut-through FIFO. This is achieved while maintaining the overall SSD controller architecture.

Figure 4:
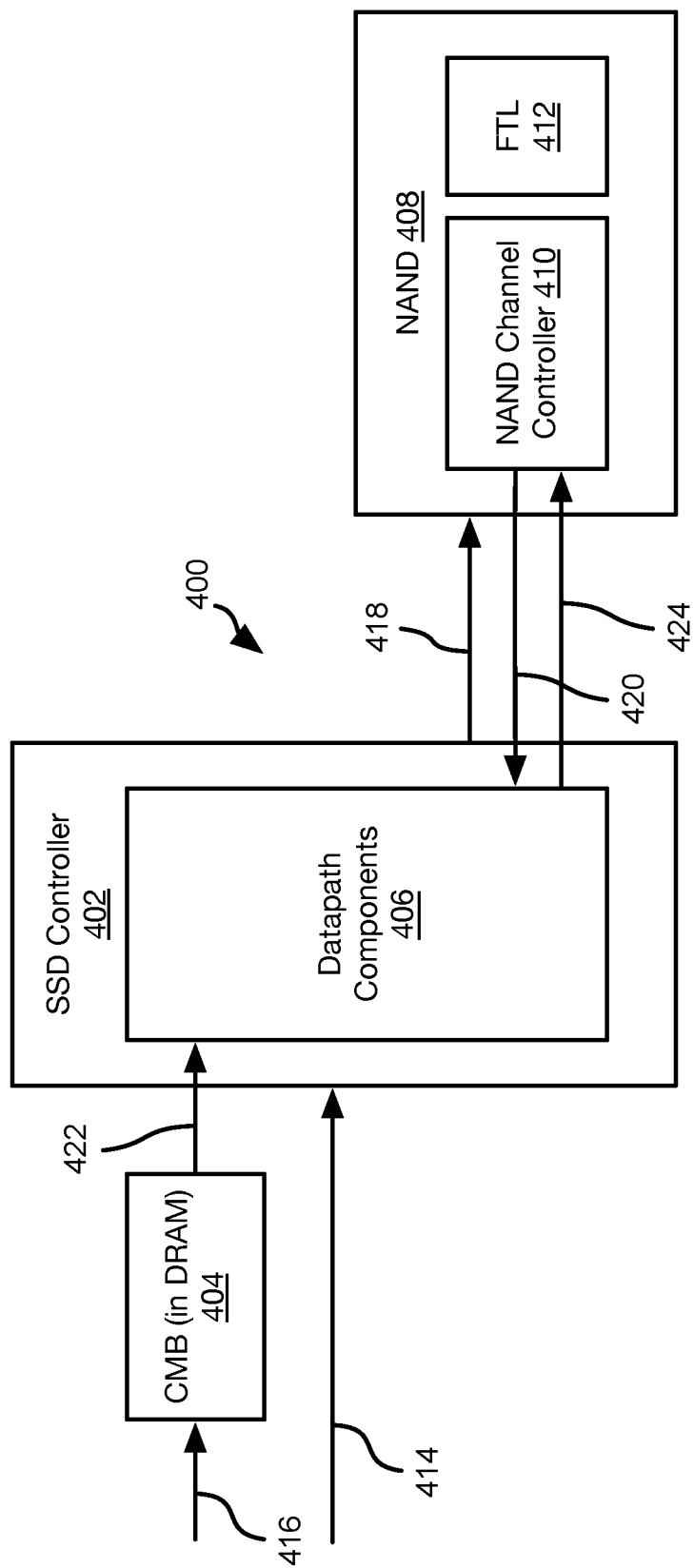
FIG. 4 is a schematic block diagram of components for implementing a write data flow without a write buffer in accordance with an embodiment of the present invention.

Referring to FIG. 4, an architecture 400 in one embodiment includes an SSD controller 402 including a CMB 404 in a DRAM and datapath components 406. The SSD controller 402 is coupled to a NAND device 408 including a NAND channel controller 410, flash translation layer (FTL) 412, and other control path components as known in the art. The write buffer is completely eliminated.

Before the host application sends an IO write command 414, it writes the data and metadata 416 for the write command into the CMB 404, either in a continuous buffer or in scattered locations. Even though the controller 402 has no way of knowing the formatting of the data prior to receiving the write command, the data 416 is physically in the controller 402 already. Therefore, in some embodiments, there is no separate write buffer, since CMB 404 itself can serve the same purpose.

In the illustrated embodiment, the data and metadata 416 for the write command 414 reside in the CMB 404 in its raw format even after the controller 402 receives the write command 414. The LBA (logical block address) information 418 of the write command 414 is passed towards the NAND 408, going through the FTL 412 and other control path components as known in the art. The NAND channel controller 410 provides feedback information 420 to the datapath component 406 indicating that a NAND die scheduled to be programmed is ready for transfer. Upon receiving the feedback information 420, the datapath component 406 reads 422 the data 416 from the CMB 404 and starts the processing the data from the CMB 404 to obtain processed data 424 and transfers the processed data 424 to the NAND channel controller 410. The processing of the datapath component 406 may include some or all of the processing of the datapath components 304.

In the embodiment of FIG. 4, everything between the CMB 404 and the NAND 408 is in-line, including the processing of the datapath components 406 such as data assembly, metadata handling, E2E protection, encryption, compression, padding, ECC (error correction coding), RAID (redundant array of independent disks), scramble etc. The write throughput therefore can match the bandwidth of these datapath components.

Although the approach of FIG. 4 provides an improvement over prior designs, it requires an architecture that deviations significantly from the non-CMB-based design. The control flow is different now that the intermediate write buffer is eliminated. Typically, the write buffer location for write data is used to track the flow in the SSD controller. Eliminating the write buffer therefore increases design complexity and increases risk.

In the embodiment of FIG. 4, the data transfer from the host memory space is postponed since the host memory space is borrowed for the controller's write buffer. It means that host non-FUA write command completion also must be postponed. A non-FUA write command is the typical write command that a host sends and doesn't require the write data to reach the non-volatile media (NAND) before the controller sends back an acknowledgement of command completion. Typically, controllers send back the command completion once the data is written to the write buffer. In the above implementation, the controller is not able send back this "early" completion because the CMB is in the host memory space. In particular, after the acknowledgment of completion is sent, the host might wipe out the data before the controller transfers the data to the NAND.

Figure 5A:
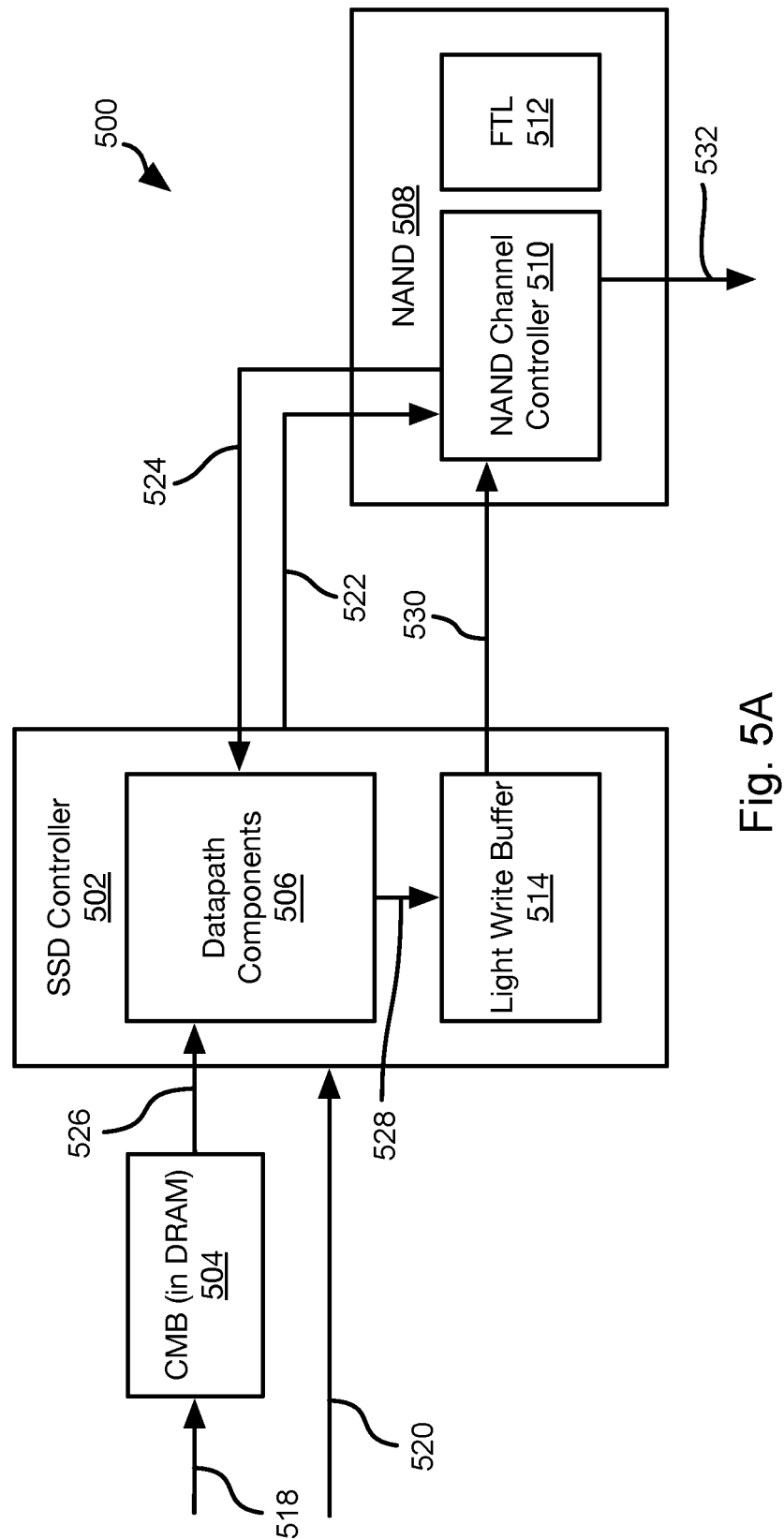
FIG. 5A is a schematic block diagram of components for implementing a write data flow with a light write buffer in accordance with an embodiment of the present invention.

FIG. 5A illustrates another architecture 500 including an SSD controller 502 a CMB 504 in a DRAM, and datapath components 506. The SSD controller 502 is coupled to a NAND device 508 including a NAND channel controller 510, flash translation layer (FTL) 512, and other control path components of a NAND device as known in the art.

Figure 5B:
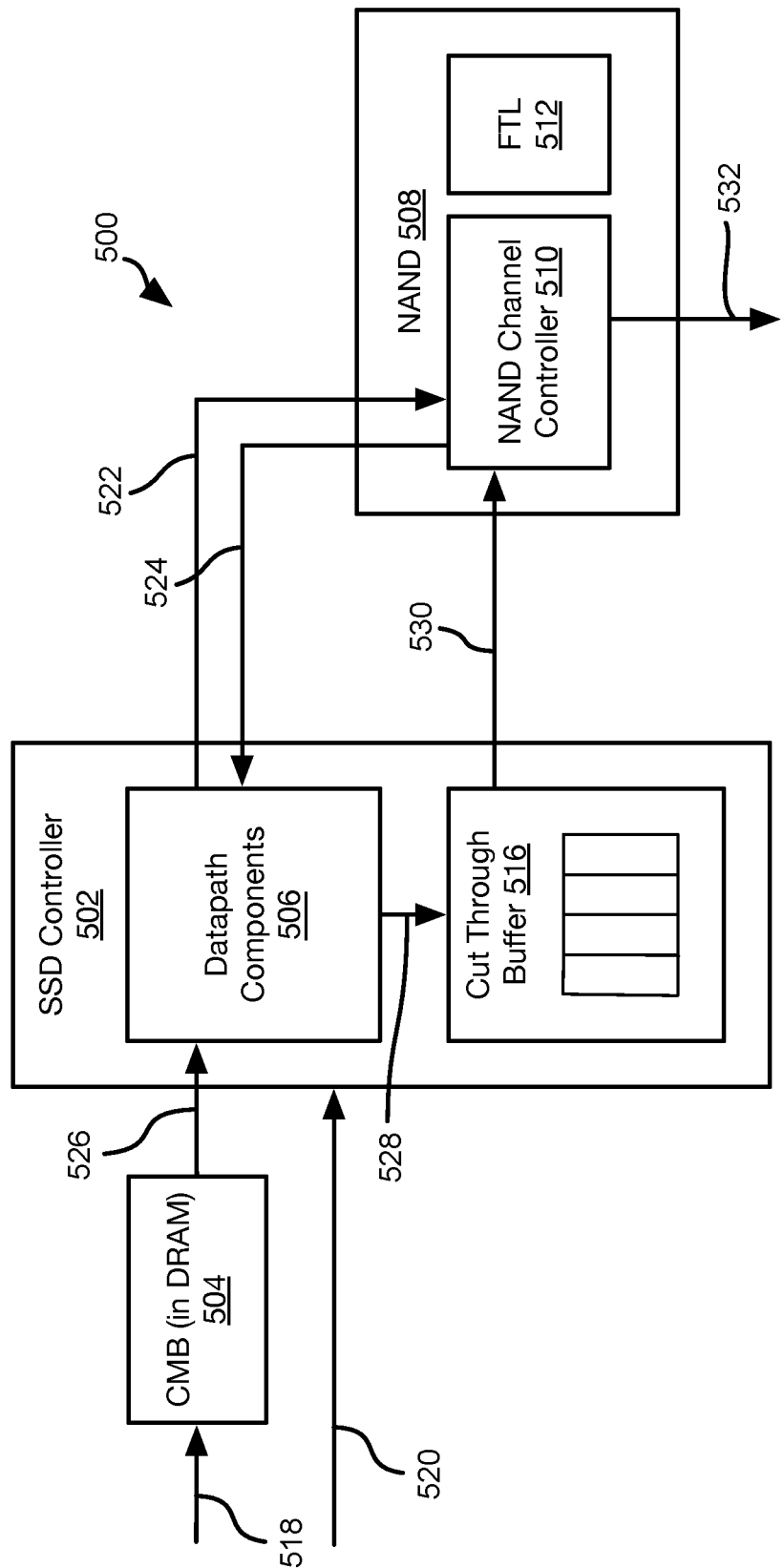
FIG. 5B is a schematic block diagram of components for implementing a write data flow with a cut through buffer as the light write buffer in accordance with an embodiment of the present invention.

In the illustrated embodiment, the SSD controller 502 includes a light write buffer (LWB) 514 that is not located in the DRAM, particularly the same DRAM as the CMB 504. In the embodiment of FIG. 5B a cut through buffer 516 takes the place of the LWB 514.

The introduction of the LWB 514 or cut through buffer 516 reduces the two drawbacks of the design shown in FIG. 4. By adjusting the ratio between the data tenure in the CMB 504 and the LWB 514, the size of the LWB 514 or cut through buffer 516 may be reduced so that it can be moved out of DRAM, thus offloading the DRAM bandwidth. The LWB 514 or cut through buffer 516 may instead be implemented using SRAM (static random access memory), internal registers, non-volatile memory, or other type of memory other than DRAM.

Considering the design shown in FIG. 3, the data tenure $T_{WB}$ in the write buffer 308 depends on many factors that are specific to each SSD controller architecture. For example, the FTL scheme determines at which step the write data buffer is released. NAND properties determines the program algorithms, program size and program time. NAND IO speed determines the transfer time of the data. The NAND configuration determines the level of parallelism of the transfer. $T_{WB}$ represents the average time that a block of data stays in the write buffer. How it is calculated may be according to any approach known in the art according to the NAND storage devices and NAND channel controller 312 that is used.

The write throughput (WTP) represent the throughput of the write data that enters and exits the write buffer 308. This is typically lower than the throughput of the data that is being written into the NAND storage device since there will be extra data such as ECC and metadata that are being written with the user data.

The size $S_{WB}$ of write buffer in the design of FIG. 3 should therefore be: $S_{WB}=T_{WB} \times WTP$. Typical values of $S_{WB}$ range from about 2 MB (Megabytes) to tens of MB, depending on the SSD controller architecture.

In the embodiment of FIG. 5A including both a CMB 504 and LWB 514 the tenure of the data inside the SSD controller 502 can be roughly split in two parts the tenure $T_{CMB}$ in the CMB and the tenure $T_{LWB}$ in the LWB. Assuming that the write commands arrives in the controller immediately after write data is pushed into CMB: $T_{LWB}$, $T_{CMB}$, $T_{WB}$.

The size of the LWB or cut through buffer 516 may therefore be approximately equal to $S_{LWB} \approx S_{WB} \times T_{LWB}/T_{WB}$, e.g. within 10 percent of this value. The LWB size is typically rounded up from $S_{LWB}$ as calculated above, i.e. to lie on a boundary according to the access granularity and SRAM size. In practice, a depth of the LWB 514 or cut through buffer 516 is less than half of the depth of the CMB 504, preferably less than one fifth of the depth of the CMB 504, and more preferably, less than one 50th of the depth of the CMB due to the amount of SRAM that can be placed in a typical SSD controller SOC (system on a chip). There is a wide range of LWB 514 and cut through buffer 516 sizes relative to the depth of the CMB 504 due to the wide range of CMB sizes in various applications.

If the write data is held in the CMB 504 until the NAND die is ready for transfer, or depending on the FTL scheme, until the program is done, $T_{LWB}$ is practically zero. The corresponding $S_{LWB}$ is also zero, which makes the LWB 514 a cut through buffer 516, as shown in the embodiment of FIG. 5B. In particular, the cut through buffer 516 may function such that data is read from it before the data has been entirely written to the buffer 516.

The flow of the embodiment 500 of either of FIGS. 5A and 5B may be as follows. Write data 518 is received by the SSD controller 502 and stored in the CMB 504. A write command 520 is also received by the SSD controller 502 for the write data 518. The SSD controller 502 responds to the write command 520 by notifying 522 the NAND device 508, such as the NAND channel controller 510. The notification may include an LBA from the write command.

The NAND channel controller 510 then notifies 524 the SSD controller 502 when a NAND die is ready to be programmed with the write data 518. The SSD controller 502 then retrieves a logical block 526 containing the write data 518 from the CMB 504 and inputs the logical block 526 to the datapath components 506. The datapath components 506 then perform the various processing datapath functions described above (e.g., data assembly, metadata handling, E2E protection, encryption, compression, padding, ECC (error correction coding), RAID (redundant array of independent disks), scramble etc.) and output processed data 528, which is written to the LWB 514. The NAND channel controller 510 then reads 530 the processed data 528 from the LWB 514 when it is ready. For example, the NAND channel controller 510 may attempt to read data from the LWB 514 but will not be able to do so until the datapath components 506 begin writing the processed data 528 to it.

The NAND channel controller 510 writes 532 the processed data 528 to a NAND storage device. The manner in which the NAND storage device is programmed to store the data 528 may be according to any approach known in the art for implementing a NAND flash storage device.

In the embodiment of FIG. 5B the processing is the same with the cut through buffer 516 taking the place of the LWB 514. Data is read as it is written, e.g. reading commences before the buffer 516 is filled. Alternatively, reading of a unit of data (e.g., a page or block) from the buffer 516 commences before that unit of data is completely written to the buffer 516.

In the embodiments of FIGS. 5A and 5B, the SSD controller 502 may choose to allocate a specific write buffer location for the LWB 514 or cut through buffer 516 as a "virtual buffer", which operates as a simple FIFO (first in first out) buffer. The virtual buffer may be allocated within a memory different from the DRAM implementing the CMB 504. For example, internal memory or registers of the SSD controller 502 may be operated as the virtual buffer.

When the NAND Channel Controller 510 is ready to transfer the write data, it does two things. First, it notifies 524 the datapath components 506 that the NAND storage device is ready for transfer, so that datapath components 506 will start fetching the write data from CMB, process it, and write it into the virtual buffer. Second, the NAND channel controller 510 will begin attempting to read the data from the "virtual buffer" location, which won't return valid data until the datapath components write the data 528 into the virtual buffer.

Neither the datapath components 506 nor the NAND channel controller 510 is aware of the special virtual buffer. In particular, very little modification of these components 506, 510 is required relative to their configuration in the conventional architecture of FIG. 3. One modification is that the datapath components 506 which read data from the CMB 504 are now NAND status aware and will not start a transfer until the NAND Channel controller instructs it to, e.g. upon receiving the notification 524.

The virtual buffer also serves the purpose of balancing a bandwidth difference between a NAND channel implemented by the NAND channel controller 510 and the datapath components 506. In some embodiments, each NAND channel implemented by the NAND channel controller 510 has a dedicated virtual buffer. The depth of the virtual buffer may be at least the size of a logical block.

The approach of FIGS. 5A and 5B may also be used to enable a tradeoff between the non-FUA (Force Unit Access) write command completion latency and $S_{LWB}$. In this case, the virtual buffer will not be used. Instead, a small SRAM (static random access memory) buffer may be used as the write buffer (LWB 514 or cut through buffer 516). A small SRAM buffer may be in the range of sizes for $S_{LWB}$ as described above. The SSD controller 502 may be programmed to measure or otherwise calculate $T_{CMB}$ and $T_{LWB}$ such that non-FUA write command completion latency is reduced while the write data can still afford to use SRAM as the buffer before being written into a NAND storage device. As noted above, the size $S_{LWB}$ of the LWB 514 may be $S_{LWB} \approx S_{WB} \times T_{LWB}/T_{WB}$. The write command latency in this case is therefore $T_{WB}-T_{LWB}+T_{controller}$, where $T_{controller}$ is the controller latency to process a non-FUA write command, which in prior approaches is about 10-20 µs.

In view of the foregoing, the embodiments described above relieve the write throughput bottleneck caused by DRAM bandwidth when using a CMB for write data. Alternatively or additionally, the approach of FIGS. 5A and 5B may be used to lower cost and power consumption by using a slower, less expensive DRAM for the CMB 504 while still achieving the same level of performance of a prior approach with a faster, more expensive DRAM.

For example, consider a SSD meeting the following specification:
DRAM interface with DQ32 at 3200 MT/s
PCIe interface with at least 3.6 GB/s effective bandwidth
NAND interface with at least 4 GB/s effective bandwidth
Enough NAND dies per channel not to limit the SSD Write Throughput
Datapath Component and control paths are not limiting SSD Write Throughput The write throughput of this type of SSD using the approach of FIG. 2 is typically limited by the DRAM Bandwidth.

Let UDRAM be the utilization rate of the DRAM, representing the percentage of the DRAM bandwidth that is being utilized for the write data transfer.

For a design like the one shown in FIG. 2:
$WTP_{Prior}=(3200 \text{ MT/s})\times(32b)\times UDRAM/4$; and
Assuming UDRAM is 50%, $WTP_{prior}$ equals to 1600 MB/s.

For a design like the one shown in FIG. 5:
$WTP_{new}=(3200 \text{ MT/s})\times(32b)\times UDRAM/2$; and
Assuming UDRAM is 50%, $WTP_{new}$ equals to 3200 MB/s.

The embodiments disclosed herein can achieve two times the write throughput compared to the prior design by reducing the traffic going in and out of DRAM. This benefit is further achieved using conventional components with very little modification.

The present invention may be embodied in other specific forms without departing from its spirit or essential characteristics. The described embodiments are to be considered in all respects only as illustrative, and not restrictive. In particular, although the methods are described with respect to a NAND flash SSD, other SSD devices or non-volatile storage devices such as hard disk drives may also benefit from the methods disclosed herein. The scope of the invention is, therefore, indicated by the appended claims, rather than by the foregoing description. All changes which come within the meaning and range of equivalency of the claims are to be embraced within their scope.

What is claimed is:

1. A method comprising:
    (a) receiving, by a storage device controller, write data;
    (b) storing, by the storage device controller, the write data in a control memory buffer (CMB);
    (c) receiving, by the storage device controller, a write command for the write data after (a);
    (d) after (c), refraining, by the storage device controller, from processing the write command until a ready signal is received, the ready signal indicating that a storage device is ready to receive data;
    (e) receiving, by the storage device controller, the ready signal;
    (f) after (e), processing, by the storage device controller, the write data in the control memory buffer to obtain processed data;
    (g) writing, by the storage device controller, the processed data to the storage device;
    after performing (f) and at least one of before and during performing (g), writing the processed data to a light write buffer (LWB) that is implemented on a different memory device than the CMB; and
    wherein (g) further comprises reading, by the storage device, the processed data from the LWB.

2. The method of claim 1, wherein the storage device is a NAND flash storage device and wherein the ready signal is received from a NAND channel controller coupled to the NAND flash storage device, the ready signal indicating that the NAND flash storage device is ready to be programmed.

3. The method of claim 1, wherein (c) through (g) are performed without writing the processed data to any memory device.

4. The method of claim 1, wherein the CMB is implemented using dynamic random access memory (DRAM) and the LWB is implemented using static random access memory (SRAM).

5. The method of claim 1, wherein the CMB is implemented using dynamic random access memory (DRAM) and the LWB is implemented using on-chip registers of the storage device controller.

6. The method of claim 1, wherein the LWB is smaller than the CMB.

7. The method of claim 6, wherein a depth of the LWB is less than one tenth a depth of the CMB.

8. The method of claim 1, further comprising using the LWB as a cut through buffer.

9. The method of claim 1, wherein the storage device controller is a solid state device (SSD) controller implementing the PCIe (peripheral component interconnect express) protocol and is coupled to a PCIe fabric, the write command being received from a component coupled to the PCIe fabric.

10. A system comprising:
    a storage device;
    a storage controller coupled to the storage device;
    a first memory implementing a control memory buffer (CMB), the first memory being coupled to the storage controller and;
    a second memory different from the first memory and implementing a light write buffer (LWB);
    wherein the storage controller is programmed to:
    (a) receive write data;
    (b) store the write data in a control memory buffer (CMB);
    (c) receive a write command for the write data after (a);
    (d) after (c), refrain from processing the write command until a ready signal is received, the ready signal indicating that a storage device is ready to receive data;
    (e) receive the ready signal;
    (f) after (e), process the write data in the control memory buffer to obtain processed data;
    (g) write the processed data to the storage device and;
    after performing (f) and at least one of before and during performing (g), write the processed data to the LWB; and
    wherein storage device is programmed to perform (g) by reading the processed data from the LWB.

11. The system of claim 10, wherein the storage device is a NAND flash storage device programmed to output the ready signal when a die of the NAND flash storage device is ready to be programmed.

12. The system of claim 10, wherein the storage controller is programmed to perform (c) through (g) without writing the processed data to the first memory implementing the CMB.

13. The system of claim 10, wherein the first memory is a dynamic random access memory (DRAM) and the second memory is a static random access memory (SRAM).

14. The system of claim 10, wherein the first memory is a dynamic random access memory (DRAM) and the second memory is implemented using on-chip registers of the storage controller.

15. The system of claim 10, wherein the LWB is smaller than the CMB.

16. The system of claim 15, wherein a depth of the LWB is less than a depth of the CMB.

17. The system of claim 10, wherein the LWB is a cut through buffer.

18. The system of claim 10, wherein the storage controller is a solid state device (SSD) controller implementing the PCIe (peripheral component interconnect express) protocol, the system further comprising a PCIe fabric and a component coupled to the PCIe fabric and programmed to output the write data and the write command.

\* \* \* \* \*